United States Patent
Choi et al.

(10) Patent No.: US 8,843,379 B2
(45) Date of Patent: Sep. 23, 2014

(54) APPARATUS, ELECTRONIC APPARATUS AND METHOD FOR ADJUSTING JITTER BUFFER

(75) Inventors: Seung-Han Choi, Daejeon-si (KR); Do-Young Kim, Daejeon-Si (KR); Byung-Sun Lee, Daejeon-Si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 157 days.

(21) Appl. No.: 13/242,693

(22) Filed: Sep. 23, 2011

(65) Prior Publication Data
US 2012/0123774 A1    May 17, 2012

(30) Foreign Application Priority Data
Sep. 30, 2010  (KR) .................. 10-2010-0095577

(51) Int. Cl.
  *G10L 19/00* (2013.01)
  *H04L 29/06* (2006.01)
  *H04L 12/861* (2013.01)
(52) U.S. Cl.
  CPC .............. *H04L 65/608* (2013.01); *H04L 65/80* (2013.01); *H04L 49/90* (2013.01)
  USPC .......................... 704/500; 370/229; 370/252
(58) Field of Classification Search
  USPC .......... 704/228, 500; 370/229, 252, 235, 331, 370/352
  See application file for complete search history.

(56) References Cited

U.S. PATENT DOCUMENTS

| | | | |
|---|---|---|---|
| 6,360,271 B1 * | 3/2002 | Schuster et al. ............ | 709/231 |
| 6,684,273 B2 * | 1/2004 | Boulandet et al. ............ | 710/52 |
| 6,700,895 B1 * | 3/2004 | Kroll ............................ | 370/412 |
| 7,006,511 B2 * | 2/2006 | Lanzafame et al. .......... | 370/412 |
| 7,680,099 B2 * | 3/2010 | Lakaniemi ..................... | 370/352 |
| 2002/0007429 A1 * | 1/2002 | Boulandet et al. ............ | 710/52 |
| 2002/0167911 A1 * | 11/2002 | Hickey ......................... | 370/252 |
| 2002/0181419 A1 * | 12/2002 | Zhang et al. ................. | 370/331 |
| 2003/0112758 A1 * | 6/2003 | Pang et al. ................... | 370/235 |
| 2004/0120309 A1 * | 6/2004 | Kurittu et al. ................ | 370/352 |
| 2004/0179474 A1 * | 9/2004 | Usuda et al. ................. | 370/229 |
| 2005/0007952 A1 * | 1/2005 | Scott ............................ | 370/229 |
| 2006/0056383 A1 * | 3/2006 | Black et al. ................... | 370/350 |
| 2007/0206645 A1 * | 9/2007 | Sundqvist et al. ............ | 370/516 |
| 2008/0240004 A1 * | 10/2008 | Shaffer et al. ................ | 370/296 |
| 2010/0290454 A1 * | 11/2010 | Lundberg ..................... | 370/352 |
| 2011/0222423 A1 * | 9/2011 | Spindola et al. ............. | 370/252 |

OTHER PUBLICATIONS

Garch-based adaptive playout delay algorithm for VoIP, Ying Zhang, 2010 Elsevier B.V. All rights reserved.doi:10.1016/j.comnet.2010.06.006.*

* cited by examiner

*Primary Examiner* — Jialong He
(74) *Attorney, Agent, or Firm* — Nelson Mullins Riley & Scarborough LLP; Anthony A. Laurentano, Esq.; Dipti Ramnarain, Esq.

(57) ABSTRACT

An apparatus, electronic apparatus and method for adjusting jitter buffer is provided. A previous jitter buffer size based on a jitter buffer size determined according to an adaptive jitter buffer size calculation algorithm is applied in predicting a jitter buffer size of future time such that the predicted jitter buffer size is applied to obtain a jitter buffer size of a valid time. The audio quality of the speech transmitted over a packet switched network is enhanced.

16 Claims, 8 Drawing Sheets

FIG. 8

| | | |
|---|---|---|
| 800 | int arma-1-0_x_t | ARMA (1, 0) MODEL BASED JITTER BUFFER SIZE PREDICTION (AT TIME T) |
| 802 | int arma-1-0_x_t_1 | ACTUAL JITTER BUFFER SIZE AT T-1 |
| 804 | double arma-1-0_phi1 | AR COEFFICIENT AT T-1 |
| 806 | double arma-1-0_const | ARMA (1, 0) MODEL CONSTANT |
| 808 | int arma-2-0_x_t | ARMA (2, 0) MODEL BASED JITTER BUFFER SIZE PREDICTION (AT TIME T) |
| 810 | int arma-2-0_x_t_1 | ACTUAL JITTER BUFFER SIZE AT T-1 |
| 812 | int arma-2-0_x_t_2 | ACTUAL JITTER BUFFER SIZE AT T-2 |
| 814 | double arma-2-0_phi1 | AR COEFFICIENT AT T-1 |
| 816 | double arma-2-0_phi2 | AR COEFFICIENT AT T-2 |
| 818 | double arma-2-0_const | ARMA (2, 0) MODEL CONSTANT |
| 820 | int arma-1-1_x_t | ARMA (1, 1) MODEL BASED JITTER BUFFER SIZE PREDICTION (AT TIME T) |
| 822 | int arma-1-1_x_t_1 | ACTUAL JITTER BUFFER SIZE AT T-1 |
| 824 | int arma-1-1_x_f_t_1 | BUFFER SIZE PREDICTION AT TIME T-1 |
| 826 | double arma-1-1_phi1 | AR COEFFICIENT AT T-1 |
| 828 | double arma-1-1_theta1 | MR COEFFICIENT AT T-1 |
| 830 | double arma-1-1_const | ARMA (1, 1) MODEL CONSTANT |

APPARATUS, ELECTRONIC APPARATUS AND METHOD FOR ADJUSTING JITTER BUFFER

CROSS-REFERENCE TO RELATED APPLICATION

This application claims the benefit under 35 U.S.C. §119 (a) of Korean Patent Application No. 10-2010-0095577, filed on Sep. 30, 2010, the disclosure of which is incorporated by reference in its entirety for all purposes.

BACKGROUND

1. Field

The following description relates to a network communication technique, and more particularly, to a technique for improving jitter.

2. Description of the Related Art

Packet delays in a packet switched network vary between a sending end and a receiving end, and this generates jitter that represents the difference in delay time among arriving packets. In order to compensate for the jitter, a jitter buffer is used. However, if the size of the jitter buffer is too large, jitter delay is increased and if the size of the jitter buffer is too small, the chance of packet loss is increased and thus audio quality may be degraded.

Many studies have been undertaken recently on a technique of calculating the optimal size of a jitter buffer. In general, for a terminal of Internet phones, an adaptive jitter buffer size calculation algorithm is used. Most of the adaptive jitter buffer size calculation algorithm performs calculation by use of network variable delay at a present time and the amount of burst in a reception of packets. However, there is a difference between a time at which the size of a jitter buffer is calculated and applied and the time at which the network variable delay and the amount of buffer are observed and analyzed for the calculation of the jitter buffer size. In this case, the effectiveness of the calculation may be lowered. In addition, errors caused when the size of the jitter buffer is calculated may degrade audio quality of incoming speech.

SUMMARY

In one aspect, there is provided a technique, A previous jitter buffer size based on a jitter buffer size determined according to an adaptive jitter buffer size calculation algorithm is applied in predicting a jitter buffer size of future time such that the predicted jitter buffer size is applied to obtain a jitter buffer size of a valid time.

In one general aspect, there is provided an apparatus for adjusting a jitter buffer. The apparatus includes a jitter control unit configured to estimate a possible jitter buffer size of a second time succeeding a first time by use of a jitter buffer size of the first time, and at a moment of the second time, to select a minimum between the estimated possible jitter buffer size of the is second time and a jitter buffer size of the second time as a jitter buffer size for buffering.

The jitter buffer size of the first time and the jitter buffer size of the second time may be calculated through an adaptive jitter buffer size calculation scheme. The jitter control unit may estimate the possible jitter buffer size of the second time by use of at least one auto-regressive moving average (ARMA) model. The at least one ARMA model may include an ARMA (1, 0) model, an ARMA (2, 0) model, and an ARMA (1, 1) model. The jitter control unit may select a minimum among the jitter buffer size of the second time, a jitter buffer size estimated through the ARMA (1, 0) model, a jitter buffer size estimated through the ARMA (2, 0) model, and a jitter buffer size estimated through the ARMA (1, 1) model, as the jitter buffer size for buffering.

In another general aspect, there is provided an electronic apparatus for transmitting/receiving a packet over a packet switched network. The electronic apparatus includes a jitter buffer unit configured to calculate a jitter buffer size of a predetermined time, temporarily an incoming frame while adjusting a jitter buffer size for buffering to be suited to a jitter buffer size selected through a jitter buffer adjusting unit, and output the incoming frame after a predetermined lapse of delay time required for compensating a jitter. At reception of the calculated jitter buffer size from the jitter buffer unit, the jitter buffer adjusting unit is configured to estimate a possible jitter buffer size of a future time by use of the received jitter buffer size, and selects a minimum between the estimated possible jitter buffer size and the received jitter buffer size as the jitter buffer size for buffering.

In another general aspect, there is provided a jitter buffer adjusting method. The jitter buffer adjusting method is as follows. A jitter buffer size of a predetermined time is calculated. A jitter buffer size of a future time is estimated by use of the calculated jitter buffer size. A minimum between the estimated jitter buffer size and the jitter buffer size of the predetermined time is selected. A jitter buffer size for buffering is adjusted to the selected jitter buffer size.

According to the present invention, A previous jitter buffer size based on a jitter buffer size determined according to an adaptive jitter buffer size calculation algorithm is applied in predicting a jitter buffer size of future time such that the predicted jitter buffer size is applied to obtain a jitter buffer size of a valid time. This reduces the difference between the time at which the size of a jitter buffer is calculated and applied to the jitter buffer and the time at which the network variant delay and the amount of buffer are observed and analyzed for calculating the size of the jitter buffer. Therefore, the audio quality of the speech transmitted over a packet switched network is enhanced.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 8 is a view showing a data structure used for a jitter buffer size adjusting algorithm.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
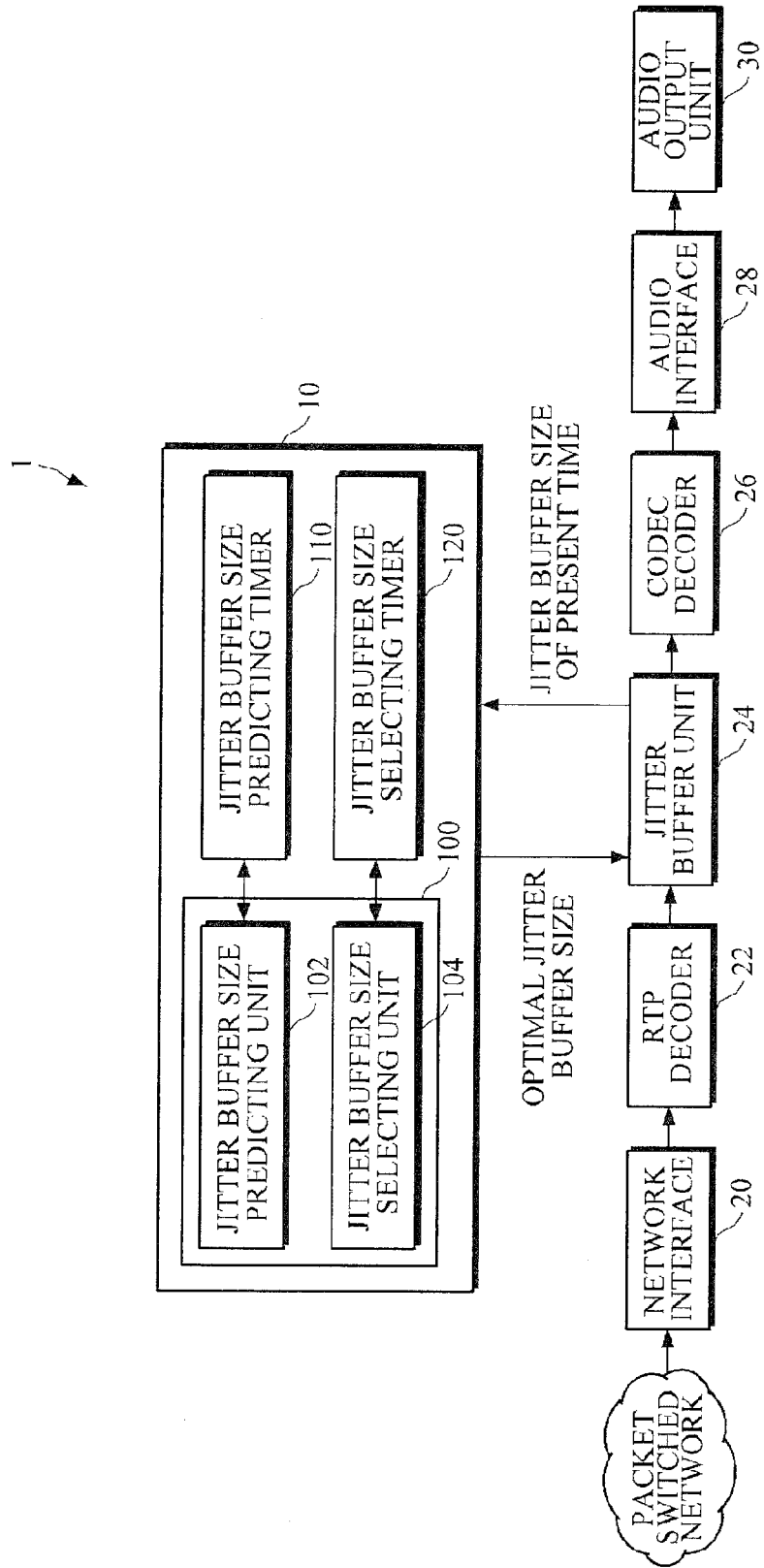
FIG. 1 is block diagram showing an example of an electronic apparatus including a jitter buffer control unit.

FIG. 1 is block diagram showing an example of an electronic apparatus including a jitter buffer control unit.

As shown in FIG. 1, an electronic apparatus 1 includes a jitter buffer control unit 10, a network interface 20, a real-time transport protocol (RTP) decoder 22, a jitter buffer unit 24, a codec decoder 26, an audio interface 28 and an audio output unit 30. The jitter buffer control unit 10 includes a jitter buffer adjusting unit 100, a jitter buffer size predicting timer 110 and a jitter buffer size selecting timer 120. The jitter buffer adjusting unit 100 includes a jitter buffer size predicting unit 102 and a jitter buffer size selecting unit 104.

The electronic apparatus 1 may include a various types of consumer electronic devices (CE) capable of performing packet transmission/reception by use of a packet switched network. According to this example, the packet switched network is an IP network and the electronic apparatus 1 is implemented using a terminal of an internet phone.

When a packet is transferred between a sending end and a receiving end over a packet switched network, a jitter may occurs. The jitter represents the difference in delay time among arriving packets, and a jitter buffer represents a space configured to temporarily store delayed signals. The electronic apparatus 1 according to this example calculates the optimal jitter buffer size and applies the calculated optimal jitter buffer size to a present time. The electronic apparatus 1 reduces jitter of digital signals by use of a jitter buffer. The jitter buffer temporarily stores digital signals, and transmits the temporarily stored digital signals according to an average transfer rate of incoming signals. Hereinafter, the above elements of the electronic apparatus 1 will be described in relation to packet reception and handling with reference to FIG. 1.

As shown in FIG. 1, the jitter buffer unit 24 calculates a jitter buffer size by use of an adaptive jitter buffer size calculation algorithm. The adaptive jitter buffer size calculation algorithm is used to calculate a jitter buffer size for buffering in an adaptable manner depending on the context of a network. The adaptive jitter buffer size calculation algorithm is developed in the sense that a user perceives a better audio quality in a well adjusted and shot discontinuous play-out than an unexpected and long discontinuous play-out of audio.

The jitter buffer unit 24 stores audio codec frames transmitted from the RTP decoder 22 and delivers the stored audio codec frame to the codec decoder 26 after a predetermined lapse of time required for jitter compensation. The jitter buffer unit 24 determines an optimum jitter buffer size selected by the jitter buffer size selecting unit 104 as a jitter buffer size of present time. Audio frames decoded by the codec decoder 26 is output to the outside by sequentially passing through the audio interface 28 and the audio output unit 30.

The jitter buffer adjusting unit 100 receives a calculated jitter buffer size from the jitter buffer unit 24, and estimates a jitter buffer size of a future time by use of the received jitter buffer size. After that, the jitter buffer adjusting unit 100 selects a minimum between the estimate jitter buffer size and the received jitter buffer size as a jitter buffer size for buffering.

In detail, the jitter buffer adjusting unit 100 includes the jitter buffer size predicting unit 102 and the jitter buffer size selecting unit 104. The jitter buffer size predicting unit 102 estimates jitter buffer sizes of a future time by use of an auto-regressive moving average (ARMA) model. The ARMA model consists of two parts including an auto-regressive (AR) part and a moving average (MA), in which the AR part has a previous observation of time series data as an explanatory variable and the MA part has a residual as an explanatory variable. If a previous pattern continues, a future time series data observation may be predicted through the ARMA model using the previous observation. According to this example, the ARMA model includes an ARMA (1, 0) model, an ARMA (2, 0) model and an ARMA (1, 1) model. A process of estimating a jitter buffer size using the ARMA will be described later with reference to FIG. 2.

The jitter buffer size selecting unit 104 selects the minimum among the jitter buffer sizes estimated through the jitter buffer size predicting unit 102 and the jitter buffer size received from the jitter buffer size, as the jitter buffer size for buffering. In this case, the jitter buffer size selecting unit 104 selects the minimum among jitter buffer sizes, which are estimated through the ARMA (1, 0) model, the ARMA (2, 0) model and the ARMA (1, 1) model, respectively, and the jitter buffer size received from the jitter buffer size as the jitter buffer size for buffering.

The jitter buffer size predicting timer 110 calls the jitter buffer size predicting unit 102, to preferably, at preset intervals. The jitter buffer size selecting timer 120 calls the jitter buffer size selecting unit 104, preferably, at preset intervals.

Figure 2:
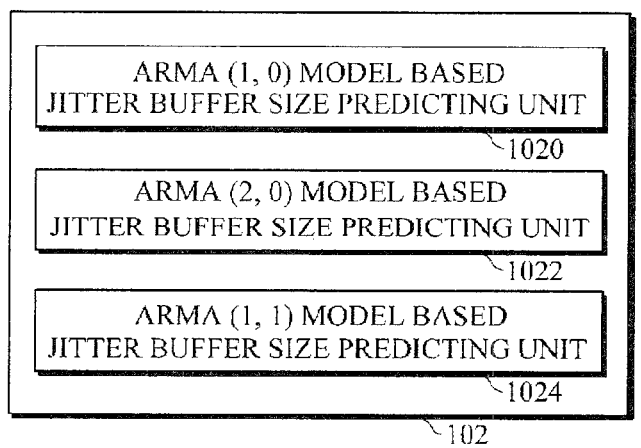
FIG. 2 is a block diagram showing an example of a jitter buffer size predicting unit of the electronic apparatus shown in FIG. 1.

FIG. 2 is a block diagram showing an example of a jitter buffer size predicting unit of FIG. 1.

As shown in FIG. 2, the jitter buffer size predicting unit 102 of the jitter buffer adjusting unit 100 includes an ARMA (1, 0) model based jitter buffer size prediction calculating unit 1020 (hereafter, referred to as an ARMA (1, 0) prediction calculating unit), an ARMA (2, 0) model based jitter buffer size prediction calculating unit 1022 (hereafter, referred to as an ARMA (2, 0) prediction calculating unit) and an ARMA (1, 1) model based jitter buffer size prediction calculating unit 1024 (hereafter, referred to as an ARMA (1, 1) prediction calculating unit).

The ARMA (1, 0) prediction calculating unit 1020 estimates a jitter buffer size of a future time by performing addition of a value, which is obtained by performing multiplication of a jitter buffer size received from the jitter buffer unit 24 at a time of 1 and an auto-regressive parameter at a time of 1, and a constant of the ARMA (1, 0) model.

The ARMA (2, 0) prediction calculating unit 1022 estimates a jitter buffer size of a future time by performing addition of a value, which is obtained by performing multiplication of a jitter buffer size received from the jitter buffer unit 24 at a time of 1 and an auto-regressive parameter at a time of 1, a value, which is obtained by performing multiplication of a jitter buffer size received from the jitter buffer unit 24 at a time of 2 and an auto-regressive parameter at a time of 2, and a constant of the ARMA (2, 0) model.

The ARMA (1, 1) prediction calculating unit 1024 estimates a jitter buffer size of a future time by performing addition of a value, which is obtained by performing multiplication of a jitter buffer size received from the jitter buffer unit 24 at a time of 1 and an auto-regressive parameter at a time of 1, and a constant of the ARMA (1, 1) model, and then subtracting a value, which is obtained by performing multiplication of an estimated possible jitter buffer size of a time of 1 to and a moving average parameter of a time of 1, from a result of the addition.

Figure 3:
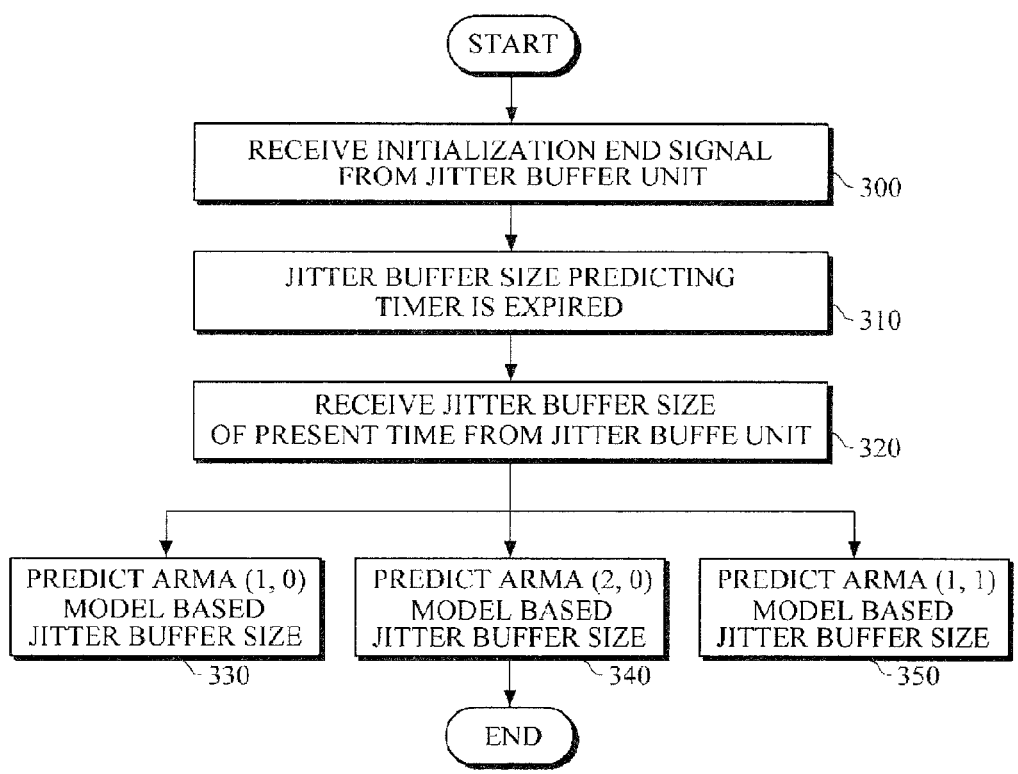
FIG. 3 is a flowchart showing an example of a jitter buffer adjusting method.

FIG. 3 is a flowchart showing an example of a jitter buffer adjusting method.

As shown in FIG. 3, at the reception of an initialization end signal from the jitter buffer unit 24 (300), the jitter buffer adjusting unit 100 operates the jitter buffer size selecting timer 120 and the jitter buffer size predicting timer 110. The expiration time of a first timer of the jitter is buffer size selecting timer 120 is 60 ms, and the expiration time of a second timer of the jitter buffer size selecting timer 120 is 500 ms. The expiration time of the jitter buffer size predicting timer 110 is 500 ms.

If the jitter buffer size predicting timer 110 expires (310), the jitter buffer adjusting unit 100 sends the jitter buffer unit 24 a request for information of the jitter buffer size of the present time and receives the requested information (320). The jitter buffer size adjusting unit 100 starts calculating jitter buffer size predictions based on the ARMA (1, 0) model (330), calculating the jitter buffer size predictions based on the ARMA (2, 0) model (340), and calculating the jitter buffer size predictions based on the ARMA (1, 1) model (350) through the jitter buffer size predicting unit 102.

The predicting operation (330) of the jitter buffer size based on the ARMA (1, 0) model will be described in detail with reference to FIG. 4. The predicting operation (340) of the jitter buffer size based on the ARMA (2, 0) model will be described in detail with reference to FIG. 5. The predicting operation (350) of the jitter buffer size based on the ARMA (1, 1) model will be described in detail with reference to FIG. 6. Further, the predicting operations will be described in detail with reference to data structure for a jitter buffer size adjusting with reference to FIG. 8.

Figure 4:
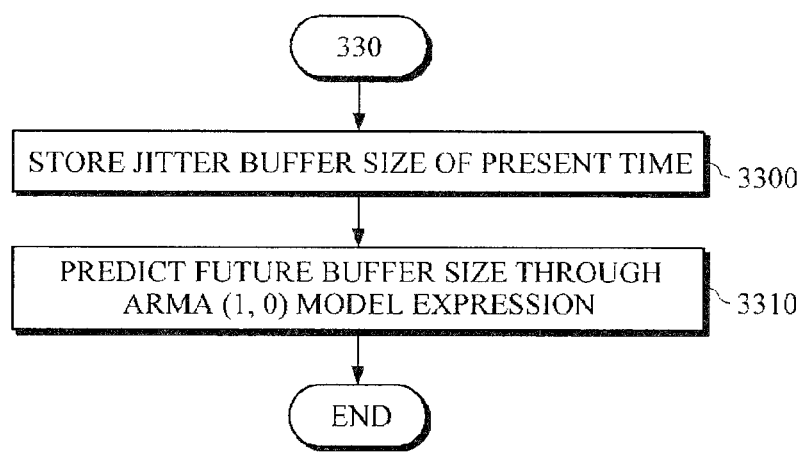
FIG. 4 is a flowchart showing a process of predicting a buffer size based on an ARMA (1, 0) model of FIG. 3.

FIG. 4 is a flowchart showing a process of predicting a buffer size based on the ARMA (1, 0) of FIG. 3.

As shown in FIG. 4, the ARMA (1, 0) prediction calculating unit 1020 stores jitter buffer size information of the present time in an arma-1-0_x_t_1 variable 802 of the data structure shown in FIG. 8 (3300). Thereafter, the ARMA (1, 0) prediction calculating unit 1020 predicts a jitter buffer size by use of a formula for the ARMA (1, 0) model based jitter buffer size prediction that is shown in equation 1.

$$\text{arma-1-0}\_x\_t = \text{arma-1-0}\_const + \text{arma-1-0}\_phi1 \times \text{arma-1-0}\_x\_t\_1 \quad \text{[Equation 1]}$$

In equation 1, arma-1-0_x_t is a variable representing an ARMA (1, 0) model based jitter buffer size prediction value at a time of t and denoted as reference numeral 800. arma-1-0_const represents an ARMA (1, 0) model constant and denoted as reference numeral 806. arma-1-0_phi1 represents an AR coefficient at a time of t−1 and denoted as reference numeral 804. arma-1-0_x_t_1 represents an actual jitter buffer size value at a time of t−1 and denoted as reference numeral 802.

The ARMA (1, 0) prediction calculating unit 1020 calculates the jitter buffer size prediction value through the equation 1, and stores the calculated jitter buffer size prediction value in the variable 800 of the data structure.

Figure 5:
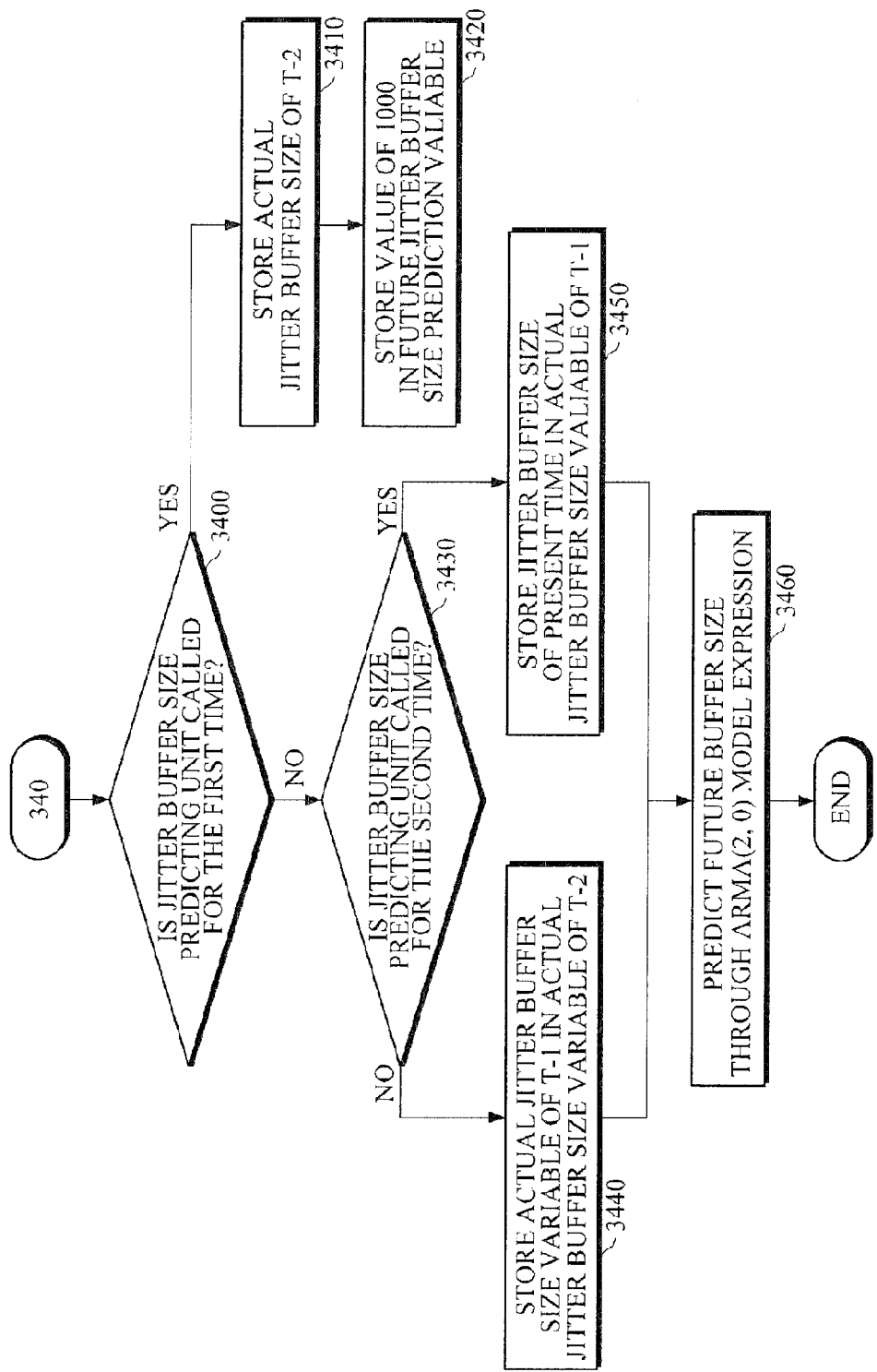
FIG. 5 is a flowchart showing a process of predicting a buffer size based on an ARMA (2, 0) model of FIG. 3.

FIG. 5 is a flowchart showing a process of predicting a buffer size based on the ARMA (2, 0) model of FIG. 3.

As shown in FIG. 5, the ARMA (2, 0) prediction calculating unit 1022 checks if the jitter buffer size predicting timer 110 calls the jitter buffer size predicting unit 102 for the first time (3400). If so, the ARMA (2, 0) prediction calculating unit 1022 stores jitter buffer size information of the present time in an arma-2-0_x_t_2 variable 812 of the data structure (3410). Thereafter, the ARMA (2, 0) prediction calculating unit 1022 stores a value of 1000 in arma-2-0_x_t variable 808 of the data structure (3420). In this manner, an ARMA (2, 0) model based jitter buffer size prediction, having not finished at initialization, is excluded in a process of selecting the optimal jitter buffer size.

Meanwhile, if it is checked in operation 3400 that the jitter buffer size predicting timer 110 does not call the jitter buffer size predicting unit 102 for the first time, the ARMA (2, 0) prediction calculating unit 1022 checks if the jitter buffer size predicting timer 110 calls the jitter buffer size predicting unit 102 for the second time (3430). If so, the ARMA (2, 0) prediction is calculating unit 1022 stores jitter buffer size information of the present time in an arma-2-0_x_t_1 variable 810 of the data structure (3450).

Thereafter, the ARMA (2, 0) prediction calculating unit 1022 calculates a jitter buffer size by use of a formula for the ARMA (2, 0) model based jitter buffer size prediction that is shown as equation 2.

$$\text{arma-2-0}\_x\_t = \text{arma-2-0}\_const + \text{arma-2-0}\_phi1 \times \text{arma-2-0}\_x\_t\_1 + \text{arma-2-0}\_phi2 \times \text{arma-2-0}\_x\_t\_2 \quad \text{[Equation 2]}$$

In equation 2, arma-2-0_x_t is a variable representing an ARMA (2, 0) model based jitter buffer size prediction value at a time of t and denoted as reference numeral 808. arma-2-0_const represents an ARMA (2, 0) model constant and denoted as reference numeral 818. arma-2-0_phi1 represents an AR coefficient at a time of t−1 and denoted as reference numeral 814. arma-2-0_x_t_1 represents an actual jitter buffer size value at a time of t−1 and denoted as reference numeral 810. arma-2-0_phi2 represents an AR coefficient at a time of t−2 and denoted as reference numeral 816. arma-2-0_x_t_2 represents an actual jitter buffer size value at a time of t−2 and denoted as reference numeral 812.

Thereafter, the ARMA (2, 0) prediction calculating unit 1022 stores the calculated jitter buffer size prediction value in the variable 808 of the data structure.

Meanwhile, if it is checked in operation 3430 that the jitter buffer size predicting timer 110 does not call the ARMA (2, 0) prediction calculating unit 1022 for the second time, the ARMA (2, 0) prediction calculating unit 1022 stores the arma-2-0_x_t_1 variable 810 in arma-2-0_x_t_2 variable 820 (3440). Then, the ARMA (2, 0) prediction calculating unit 1022 calculates a jitter buffer size prediction value through equation 2 (3460), and then stores the calculated jitter buffer size prediction value in the variable 808.

Figure 6:
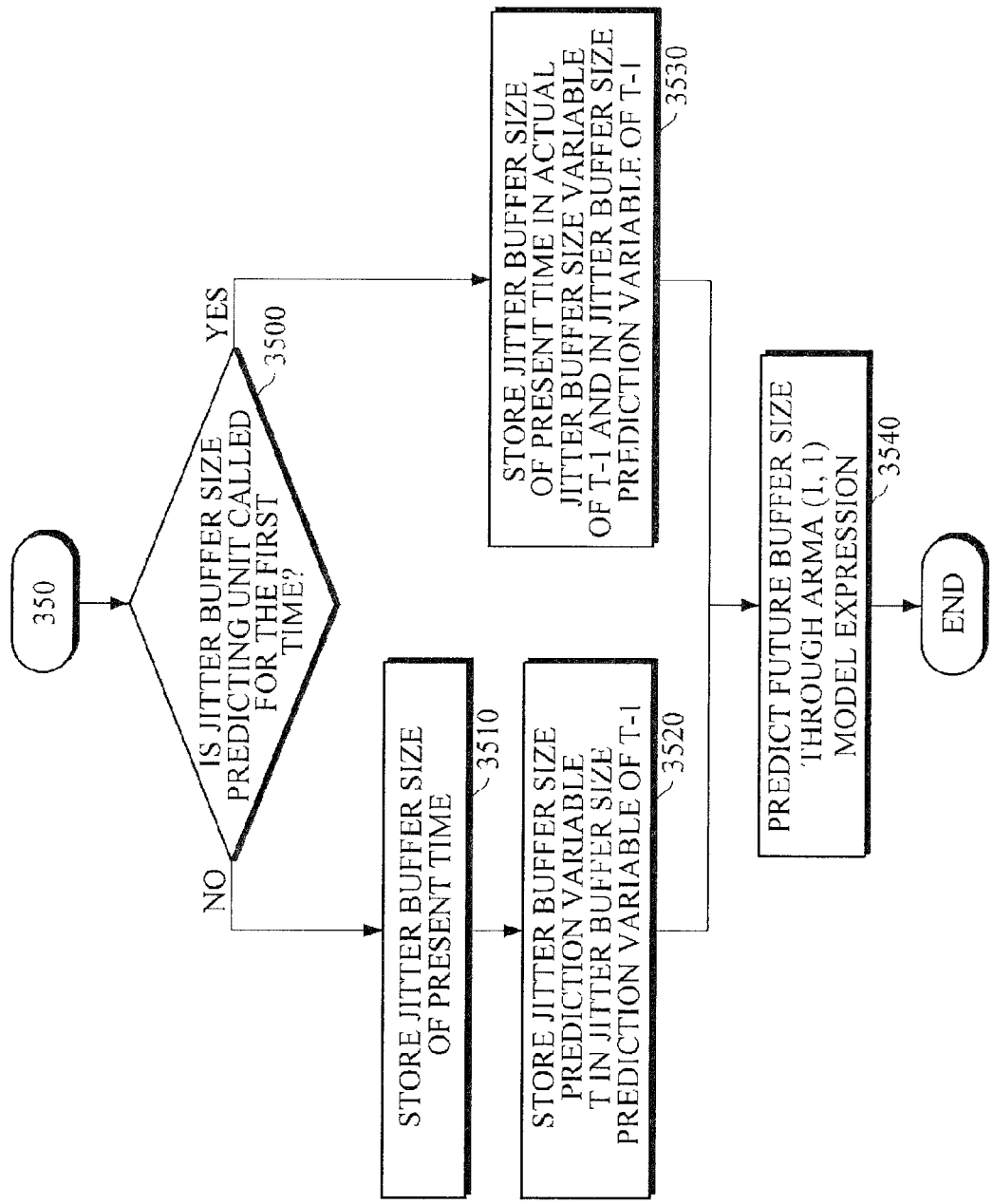
FIG. 6 is a flowchart showing a process of predicting a buffer size based on an ARMA (1, 1) model of FIG. 3.

FIG. 6 is a flowchart showing a process of predicting a buffer size base don an ARMA (1, 1) model of FIG. 3.

As shown in FIG. 6, the ARMA (1, 1) prediction calculating unit 1024 checks if the jitter buffer size predicting timer 110 calls the jitter buffer size predicting unit 102 for the first time (3500). If so, the ARMA (1, 1) prediction calculating unit 1024 stores jitter buffer size information of the present time in an arma-1-1_x_t_1 variable 822 and an arma-1-1_x_f_t_1 variable 824 of the data structure (3530).

Thereafter, the ARMA (1, 1) prediction calculating unit 1024 predicts a jitter buffer size by use of a formula for the ARMA (1, 1) model based jitter buffer size prediction that is shown as equation 3.

$$\text{arms-1-1}\_x\_t = \text{arma-1-1}\_const + \text{arma-1-1}\_phi1 \times \text{arma-1-1}\_x\_t\_1 - \text{arma-1-1}\_theta1 \times \text{arma-1-1}\_x\_f\_t\_1 \quad \text{[Equation 3]}$$

In equation 3, arma-1-1_x_t is a variable representing an ARMA (1, 1) model based jitter buffer size prediction at a time of t and denoted as reference numeral 820. arma-1-1_const represents an ARMA (1, 1) model constant and denoted as reference numeral 830. arma-1-1_phi1 represents an AR coefficient at a time of t−1 and denoted as reference numeral 826. arma-1-1_x_t__1 represents an actual jitter buffer size value at a time of t−1 and denoted as reference numeral 822. arma-1-1_theta1 represents a MA coefficient at a time of t−1 and denoted as reference numeral 828. arma-1-1_x_f_t__1 represents a jitter buffer size prediction value at a time of t−1 and denoted as reference numeral 824.

Thereafter, the ARMA (1, 1) prediction calculating unit 1024 stores the calculated jitter buffer size prediction value in the variable 820 of the data structure.

Meanwhile, if it is checked in operation 3500 that the jitter buffer size predicting timer 110 does not call the jitter buffer size predicting unit 102 for the first time, the ARMA (1, 1) prediction calculating unit 1024 stores jitter buffer size information of the present time in the arma-1-1_x_t__1 variable 822 of the data structure (3510). After that, the ARMA (1, 1) prediction calculating unit 1024 stores the arma-1-1_x_t variable 820 in the arma-1-1_x_f_t__1 variable 824 (3520).

Then, the ARMA (1, 1) prediction calculating unit 1024 predicts the jitter buffer size through equation 3 (3540), and then stores the calculated jitter buffer size prediction value in the arma-1-1_x_t variable 820.

Figure 7:
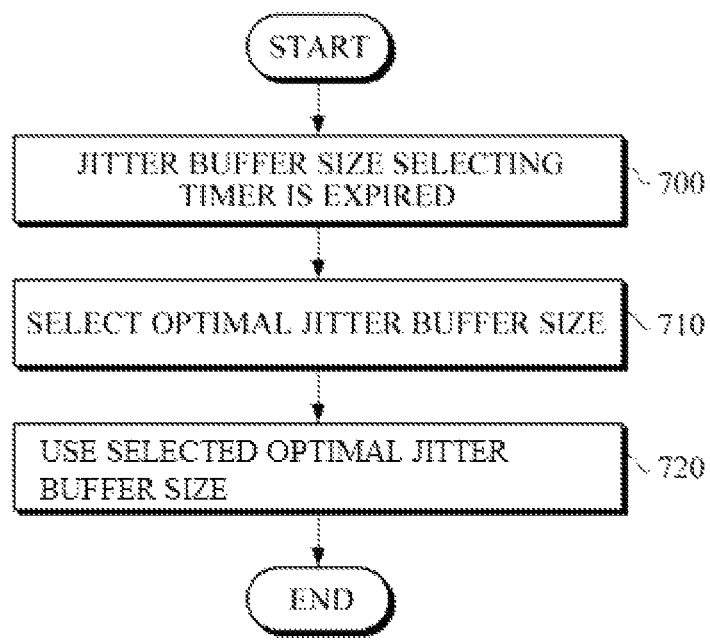
FIG. 7 is a flowchart showing an example of a jitter buffer size adjusting process.

FIG. 7 is a flowchart showing an example of a jitter buffer size adjusting process.

As shown in FIG. 7, if the jitter buffer size selecting timer 120 expires (700), the jitter buffer size selecting unit 104 sends the jitter buffer unit 24 a request for information of the jitter buffer size of the present time and receives the requested information.

The jitter buffer size selecting unit 104 selects the minimum among the value of the arma-1-0_x_t variable 800 corresponding to the jitter buffer size based on the ARMA (1, 0) model, the value of the arma-2-0_x_t variable 808 corresponding to the jitter buffer size based on the ARMA (2, 0) model, and the value of the arma-1-1_x_t variable 820 corresponding to the jitter buffer size based on the ARMA (1, 1) model, as the optimal jitter buffer size (710).

Then, the jitter buffer size selecting unit 104 delivers the selected optimal jitter buffer size to the jitter buffer unit 24. The jitter buffer unit 24 adjusts a jitter buffer size of the present time by use of the received optimal jitter buffer size (720).

FIG. 8 is a view showing a data structure used for a jitter buffer size adjusting algorithm.

In the data structure used by the ARMA (1, 0) prediction calculating unit 1020, arma-1-0_x_t is a variable representing an ARMA (1, 0) model based jitter buffer size prediction value at a time of t and denoted as reference numeral 800. arma-1-0_x_t__1 represents an actual jitter buffer size value at a time of t−1 and denoted as reference numeral 802. arma-1-0_phi1 represents an AR coefficient at a time of t−1 and denoted as reference numeral 804. arma-1-0_const represents an ARMA (1, 0) model constant and denoted as reference numeral 806.

In the data structure used by the ARMA (2, 0) prediction calculating unit 1022, arma-2-0_x_t is a variable representing an ARMA (2, 0) model based jitter buffer size prediction value at a time of t and denoted as reference numeral 808. arma-2-0_x_t__1 represents an actual jitter buffer size value at a time of t−1 and denoted as reference numeral 810. arma-2-0_x_t__2 represents an actual jitter buffer size value at a time of t−2 and denoted as reference numeral 812. arma-2-0_phi1 represents an AR coefficient at a time of t−1 and denoted as reference numeral 814. arma-2-0_phi2 represents an AR coefficient at a time of t−2 and denoted as reference numeral 816. arma-2-0_const represents an ARMA (2, 0) model constant and denoted as reference numeral 818.

In the data structure used by the ARMA (1, 1) prediction calculating unit 1024, arma-1-1_x_t is a variable representing an ARMA (1, 1) model based jitter buffer size prediction value at a time of t and denoted as reference numeral 820. arma-1-1_x_t__1 represents an actual jitter buffer size value at a time of t−1 and denoted as reference numeral 822. arma-1-1_x_f_t__1 represents an ARMA (1, 1) model jitter buffer size prediction value at a time of t−1 and denoted as reference numeral 824. arma-1-1_phi1 represents an AR coefficient at a time of t−1 and denoted as reference numeral 826. arma-1-1_theta1 represents a MA coefficient at a time of t−1 and denoted as reference numeral 828. arma-1-1_const represents an ARMA (1, 1) model constant and denoted as reference numeral 830.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for adjusting a jitter buffer, the apparatus comprising:
   a jitter control unit configured to receive a jitter buffer size of a second time, succeeding a first time;
   a jitter buffer predicting unit configured to estimate an estimated jitter buffer size of the second time by use of at least one auto-regressive moving average (ARMA) model based on a buffer size of the first time, and
   a jitter buffer selection unit, at a moment of the second time, configured to select a minimum between the estimated jitter buffer size of the second time and the received jitter buffer size of the second time before size adjustment as a jitter buffer size for buffering.

2. The apparatus of claim 1, wherein the at least one ARMA model includes at least one of an ARMA (1, 0) model, an ARMA (2, 0) model, and an ARMA (1, 1) model.

3. The apparatus of claim 2, wherein the jitter control unit selects a minimum among the jitter buffer size of the second time before the size adjustment, a jitter buffer size estimated through the ARMA (1, 0) model, a jitter buffer size estimated through the ARMA (2, 0) model, and a jitter buffer size estimated through the ARMA (1, 1) model, as the jitter buffer size for buffering.

4. The apparatus of claim 1, wherein the jitter control unit estimates the estimated jitter buffer size at predetermined time intervals and selects the jitter buffer size for buffering at predetermined time intervals.

5. An electronic apparatus for transmitting/receiving a packet over a packet switched network, the electronic apparatus comprising:
  a jitter buffer unit configured to receive a jitter buffer size of a predetermined time, temporarily store an incoming frame while adjusting a jitter buffer size for buffering to be suited to a jitter buffer size selected through a jitter buffer adjusting unit, and output the incoming frame after a predetermined lapse of delay time required for compensating a jitter,
  wherein, at reception of the received jitter buffer size from the jitter buffer unit, the jitter buffer adjusting unit is configured to estimate an estimated jitter buffer size of a future time by use of the received jitter buffer size, and select a minimum between the estimated jitter buffer size and the received jitter buffer size as the jitter buffer size for buffering,
  wherein the jitter buffer adjusting unit comprises a jitter buffer size predicting unit configured to estimate at least one jitter buffer size of the future time by use of at least one auto-regressive moving average (ARMA) model based on a buffer size of a first time.

6. The electronic apparatus of claim 5, wherein the jitter buffer adjusting unit comprises:
  a jitter buffer size selecting unit configured to select a minimum among the at least one jitter buffer size estimated through the jitter buffer size predicting unit and the jitter buffer size received from the jitter buffer unit as the jitter buffer size for buffering.

7. The electronic apparatus of claim 6, wherein the at least one ARMA model includes at least one of an ARMA (1, 0) model, an ARMA (2, 0) model, and an ARMA (1, 1) model.

8. The electronic apparatus of claim 7, wherein the jitter buffer size predicting unit estimates the jitter buffer size of the future time by performing addition of a value, which is obtained by performing multiplication of a jitter buffer size received from the jitter buffer unit at the first time and an auto-regressive parameter at the first time, and a constant of the ARMA (1, 0) model.

9. The electronic apparatus of claim 7, wherein the jitter buffer size predicting unit estimates the jitter buffer size of the future time by performing addition of a value, which is obtained by performing multiplication of a jitter buffer size received from the jitter buffer unit at a first time and an auto-regressive parameter at the first time, a value, which is obtained by performing multiplication of a jitter buffer size received from the jitter buffer unit at a second time before the size adjustment and an auto-regressive parameter at the second time, and a constant of the ARMA (2, 0) model.

10. The electronic apparatus of claim 7, wherein the jitter buffer size predicting unit estimates the jitter buffer size of the future time by performing addition of a value, which is obtained by performing multiplication of a jitter buffer size received from the jitter buffer unit at a first time and an auto-regressive parameter at the first time, and a constant of the ARMA (1, 1) model and then subtracting a value, which is obtained by performing multiplication of an estimated jitter buffer size of the first time and a moving average parameter of the first time, from a result of the addition.

11. The electronic apparatus of claim 6, further comprising a jitter buffer size prediction timer configured to call the jitter buffer size predicting unit at predetermined time intervals.

12. The electronic apparatus of claim 6, further comprising a jitter buffer size selecting timer configured to call the jitter buffer size selecting unit at predetermined time intervals.

13. The electronic apparatus of claim 6, further comprising:
  a decoding unit configured to decode a frame received through the packet switched network; and
  an audio output unit configured to output decoded audio.

14. A jitter buffer adjusting method for transmitting and receiving a packet over a packet switched network, the jitter buffer adjusting method comprising:
  calculating a jitter buffer size of a predetermined time;
  receiving a jitter buffer size of a future time, succeeding the predetermined time, that is determined;
  estimating the estimated jitter buffer size of the future time by use of at least one auto-regressive moving average (ARMA) model by use of the calculated jitter buffer size of the predetermined time;
  selecting a minimum between the estimated jitter buffer size of the future time and the received jitter buffer size of the future time; and
  adjusting a jitter buffer size for buffering to the selected jitter buffer size.

15. The jitter buffer adjusting method of claim 14, wherein the estimating of the jitter buffer size of the future time comprising at least one of:
  performing addition of a value, which is obtained by performing multiplication of a jitter buffer size of a first time and an auto-regressive parameter at the first time, and a constant of an ARMA (1, 0) model;
  performing addition of the value, which is obtained by performing multiplication of the jitter buffer size of the first time and the auto-regressive parameter at the first time, a value, which is obtained by performing multiplication of a jitter buffer size of a second time before size adjustment and an auto-regressive parameter at the second time, and a constant of an ARMA (2, 0) model; and
  performing addition of the value, which is obtained by performing multiplication of the jitter buffer size of the first time and the auto-regressive parameter at the first time, and a constant of an ARMA (1, 1) model and then subtracting a value, which is obtained by performing multiplication of an estimated jitter buffer size of the first time and a moving average parameter of the first time, from a result of the addition.

16. The jitter buffer adjusting method of claim 15, wherein the selecting of the jitter buffer size for buffering is achieved by selecting a minimum among at least one jitter buffer size estimated through at least one of the ARMA (1, 0) model, the ARMA (2, 0) model and the ARMA (1, 1) model and the jitter buffer size of the predetermined time.

* * * * *